Feb. 13, 1940.    M. O'BRIAN    2,189,762
APPARATUS FOR DRY GENERATION OF ACETYLENE
Filed Aug. 27, 1937    2 Sheets-Sheet 1

INVENTOR
MAURICE O'BRIAN
BY
ATTORNEY

Feb. 13, 1940. M. O'BRIAN 2,189,762
APPARATUS FOR DRY GENERATION OF ACETYLENE
Filed Aug. 27, 1937 2 Sheets-Sheet 2

INVENTOR
MAURICE O'BRIAN
BY
ATTORNEY

Patented Feb. 13, 1940

2,189,762

UNITED STATES PATENT OFFICE 2,189,762

APPARATUS FOR DRY GENERATION OF ACETYLENE

Maurice O'Brian, Indianapolis, Ind., assignor to The Prest-O-Lite Company, Inc., a corporation of New York Application August 27, 1937, Serial No. 161,175

14 Claims. (Cl. 48—38)

This invention relates to apparatus for producing acetylene and a dry hydrated lime residue by the reaction of calcium carbide with limited quantities of water, and more particularly to means for separating particles of hydrate from acetylene produced by the so-called dry generation of acetylene.

Generally, the object of the present invention is to provide an improved arrangement of apparatus for scrubbing the acetylene produced when carbide is reacted in a so-called "dry generator" so as to efficiently produce acetylene and also recover a substantially dry commercially useful calcium hydrate residue in powdered form.

More specifically, objects of the present invention are: to provide an apparatus of the character indicated in which the acetylene produced when reacting calcium carbide in a reaction chamber with such a limited quantity of water that dry powdery calcium hydrate is simultaneously produced, and which carries entrained particles of the hydrate, may be scrubbed clean of such particles; by which the acetylene may be effectively cooled to a desired temperature; by which large quantities of water vapor may be removed from the acetylene; by which water is prevented from reaching the dry calcium hydrate powder being produced; and by which plugging, by sediment, is prevented.

These and other objects of the invention and the novel features thereof which achieve these objects will become evident from the following detailed description taken in connection with the accompanying drawings in which.

In the co-pending application Serial No. 103,526, filed October 1, 1936, in the name of Charles Ness jointly with H. V. Kojola, there is described a method of and apparatus for the dry generation of acetylene whereby carbide is fed into a reaction chamber into which controlled amounts of water are introduced and in which is maintained a body of calcium hydrate in a desired dry and fluid-like condition. Carbide and water continuously introduced into the reaction chamber, react forming acetylene and more hydrate. The carbide introduced, together with the newly-formed hydrate, causes an upward displacement of the body of hydrate, while the gas produced passes upward through the body of hydrate to assist in maintaining its fluid-like condition. At the top of the reaction chamber the major part of the hydrate produced overflows and is withdrawn from further contact with the gas which is collected above the reaction chamber and withdrawn to a gas holder. The contents of the reaction chamber are preferably continuously agitated by mechanical means to accelerate the reaction; to insure complete contact of carbide with water; to effect the classification of the materials to insure that carbide will flow downward and displace hydrate upward; and to avoid the formation of zones of local high temperature. The amount of water added is sufficiently in excess of that needed for completing the reaction to control by its evaporation the average temperature of the contents of the reaction chamber to within desired limits.

The water that is vaporized passes off with the gas and means must be provided for removing vapors from further contact with the residue as soon as the residue leaves the reaction chamber where it was maintained at a uniform high temperature and before the vapor is cooled so as to avoid condensation of moisture on the hydrate. The settling chamber above the reaction chamber does not remove all of the finer particles of calcium hydrate entrained in the gas produced. Therefore, according to the present invention, the remaining extremely fine particles are removed by causing the gas to pass in intimate contact with a body of water which also cools the gas to a desired temperature and removes by condensation the excessive quantities of water vapor therefrom.

Figure 1:
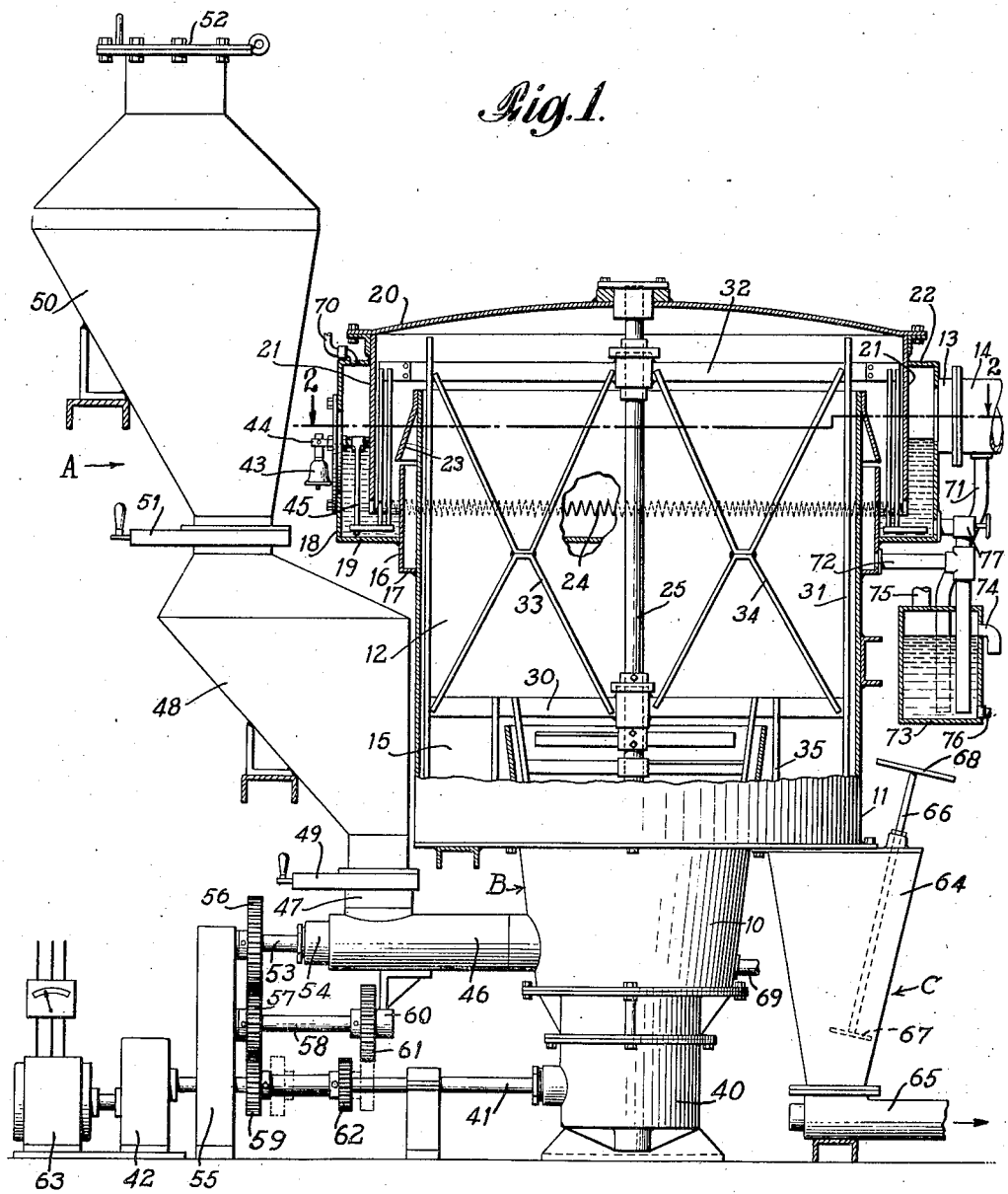
Fig. 1 is an elevational view, partly in section, of an apparatus for generating acetylene with the production of a substantially dry residue, having gas scrubbing means constructed according to the present invention.
Figure 2:
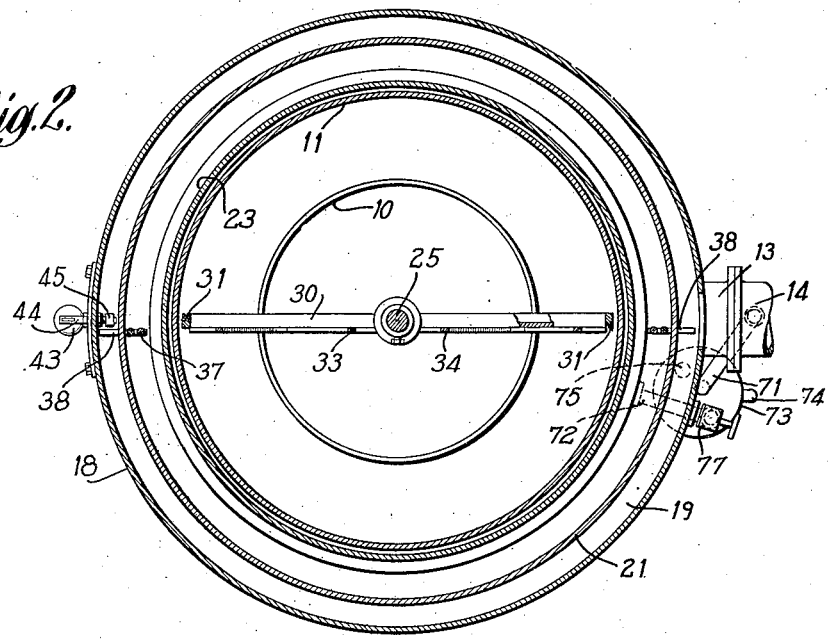
Fig. 2 is a view of a section of the apparatus shown in Fig. 1 taken on the line 2—2.

Referring now to the drawings, and particularly to Figure 1, the means for supplying carbide is shown generally at A. The reaction chamber where generation of gas occurs is shown generaly at B, and at C is shown means for collecting the dry residue. The reaction chamber B of the apparatus shown comprises the lower portion 10 of a closed generator casing 11. The portion 10 has the form of an inverted, hollow, truncated cone whose larger end is open and projects upwardly into an enlarged portion of the casing 12 wherein the gas produced separates from most of the finer particles of residue which may have been carried upward by the gas. The gas produced is led off from the generator through a conduit 13, which connects to the pipe line 14 that conducts the gas to storage means, such as a gasometer, which is not shown in the interest of clearness of the drawing.

The carbide is fed into the reaction chamber B near the bottom thereof from the carbide supply means A. The upper chamber 12 comprises an open top tank having a bottom through which the reaction chamber 10 passes centrally so as to form an annular lime collecting space or compartment 15 surrounding the upper part of the reaction chamber. At a point near the top rim of the tank 11, there is provided an annular open top chamber 16 outside of the tank 11 which has a closed bottom 17 that is welded to the outside wall of the tank. Outside of the annular chamber 16 is disposed an annular water seal chamber 18 having a closed bottom 19 that is welded to the side of chamber 16. A sheet metal cover 20 for the tank 11 is provided having a depending cylindrical skirt portion 21 that extends down into the water seal 18 to a point close to the bottom 19 thereof. The cover 20 is formed higher in the central portion so that moisture that condenses thereon will flow to the edges and run into the seal 18. The top of the water seal 18 is closed by an annular ring 22 which is welded to the upper edge of the seal 18 and to the upper portion of the skirt 21. An apron or baffle 23 surrounds the upper edge of the tank 11 in order to prevent particles of lime from falling down into the annular chamber 16. The lower edge of the skirt 21 is serrated, as shown at 24, for the purpose of providing an even distribution of, and to cause the breaking up into small bubbles of the gas that flows under the edge of the skirt 21 through the water seal 18. The water seal 18 thus constitutes an integral annular scrubber for the gas produced which is withdrawn from the space above the water in the scrubber through the outlet connection 13 and conduit 14.

Figure 3:
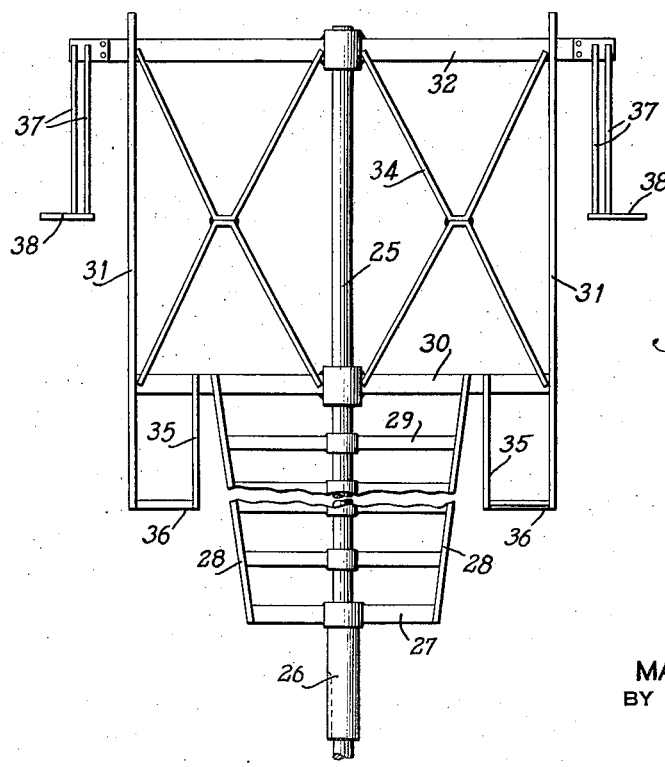
Fig. 3 is an elevational view of the rotating agitator device shown in Fig. 1.

The agitating mechanism, shown more clearly in Figure 3, comprises a frame that rotates about a vertical axial shaft 25. A short hollow shaft 26 that passes through the bottom of the reaction chamber has an upper end which is joined to the central hub of a cross-arm 27 whose outer ends are fastened to two upwardly extending members 28 of the main agitator frame. A plurality of spaced cross-arms 29 parallel to the arm 27 are also provided joining the members 28. The members 28 are arranged to closely follow the inner wall of the reaction chamber 10 and their upper ends, which extend just above the upper edge of the reaction chamber, are joined by a horizontal cross member 30. The member 30 is so long as to almost touch opposite portions of the wall of tank 11. Secured to each end of the cross member 30 are two vertical scraper bars 31. These bars follow closely the unitary cylindrical inner wall of the tank 11 to prevent any adherence of lime thereon and may have bevelled edges to facilitate the removal of lime. The bars 31 extend slightly above the edge of the tank 11 where they are joined by an upper cross member 32 whose ends extend to within a short distance from the unitary cylindrical wall of the skirt 21. The members 30, 31, and 32 are maintained in the desired relation by two X-shaped cross frames 33 and 34 whose ends are welded to the members 30 and 32. Hollow hubs are provided at the central portion of each of the members 27, 29, 30, and 32. These hubs have bores which freely rotate upon the shaft 25 which passes axially through the generator in the vertical direction. Scrapers for stirring the lime that collects in the annular chamber 15 are provided by the depending bars 35 whose lower ends are joined to the lower ends of the vertical members 31 by cross bars 36 and whose upper ends are welded to the cross member 30. The cross bars 36 may also have their leading edges bevelled for scraping the lime. Means is also provided for stirring the water in the scrubber water seal 18. This means comprises two pairs of vertical bars 37, each pair fastened to each end of the member 32 and having their lower ends attached to a horizontal scraper 38 which closely follows the bottom 19 of the water seal.

The hollow shaft 26 projects through a sealing means in the bottom of the reaction chamber 15 to prevent lime from the reaction chamber from getting into the gear box 40 and is turned by bevel gears located in a gear box 40 below the reaction chamber, the power being supplied to the gears by the power output shaft 41 of a speed reducer 42. An alarm bell 43 is provided to indicate that the outer paddle assembly carrying the scrubber scraper 38 is operating properly. To this end, the bell 43 is mounted on a horizontal shaft 44 which passes through a seal bearing 25 in the cylindrical outer wall of scrubber chamber 18. The inner end of shaft 44 carries a long dependent arm 45 reaching almost to the bottom 19 of the scrubber so that the lower end of the arm 45 is struck by each of the members 38 as the agitator revolves. The weight of the bell and the arm 45 cause the arm to return to the vertical position after displacement by the scrapers 38.

The carbide is introduced into the reaction chamber 10 by means of the conveyor operating in the housing 46 whose outlet end connects with the chamber 10 and whose other end is connected to the outlet 47 of a carbide hopper 48. The outlet 47 is controlled by a sliding type valve 49. A second carbide supply hopper 50 is disposed above the hopper 48, with a connection between the hoppers controlled by a second carbide valve 51. The hopper 50 is sealed by a lid 52. The shaft 53 of the conveyor passes through a stuffing box 54 in the end of the housing 46 and has an outer end which is journaled in the top bearing carried by the bearing support 55. A gear 56 is mounted on the shaft 53 and driven by an intermediate gear 57 mounted on a countershaft 58. The intermediate gear in turn is driven by a gear 59 on the shaft 41. The countershaft 58 has its ends journaled in a bearing in the bearing stand 55 and in a bracket bearing 60 which is mounted in a support that depends from the underside of the housing 46. Another and larger intermediate gear 61 is also mounted on the shaft 58 and a corresponding smaller gear 62 is slidingly mounted on the shaft 41 in such a way that it may be shifted into engagement with the gear 61 or out of engagement therewith as desired. The hubs of gear 59 and gear 61 are joined by a sleeve and both may be shifted simultaneously along the shaft 41 so that the countershaft 58 may be driven by either gear 59 or gear 62. Since the gears 59 and 62 are of different size, the shafts 58 and 53 will be driven at different rates of speed according to the gear ratio selected. The rate of feeding of carbide may thus be varied as desired to change the rate of gas production. The shaft 41 passes through the lower bearing in the bearing stand 55 and is connected to the output side of the speed reducer 42 which is driven by the electric motor 63. The substantially dry residue produced which collects in the annular compartment 15 is moved around by the arms 35 and scrapers 36 so that it falls into a receiving chamber 64 connected to the bottom of, and communicating with chamber 15 so as to receive the residue. The lower end of chamber 64 communicates with a lime conveyor 65 that withdraws the hydrated lime that collects in chamber 64 and deposits it in a storage hopper which is not shown in the drawings. To prevent gas from passing out through the chamber 64, and conveyor 65, a gas seal is maintained in the chamber 64. This seal is provided by maintaining a supply of the dry hydrate in the lower part of the chamber. To determine the amount of residue collected in the chamber 64, there is provided an indicating means in the form of a rod 66 having at its lower end a disk 67 and at its upper end a handle 68. The rod passes through the top of the chamber 64 through a stuffing box and by moving the rod 66 up and down the height of the lime in the chamber may be readily determined. The operation of the conveyor 65 is thereupon so controlled that a supply of lime is caused to remain in the lower part of the chamber to maintain the seal.

The water required for the reaction and for absorption of excess heat is added at points 69 close to the bottom of the reaction chamber 10. The rate of flow of the water supply may be determined by means of a flow meter comprising an orifice and manometer or by any means for maintaining a regulatable constant supply of water such, for example, as a positive displacement pump whose speed of operation may be regulated.

A supply of water is added to the scrubber seal 18 through a connection 70 which is located in the cover 22 of the seal. Excess water normally flows out of the seal through the gas outlet connection 13 which is connected to the outer wall of the seal 18 at a desired point. This overflow water runs along the bottom of connection 13 and conduit 14 until it reaches a draining conduit 71 depending therefrom. The annular chamber 16 is provided so that water which might be driven backward by an abormnal backflow of gas through this scrubber will be caught by the chamber 16 instead of being carried into the chamber 12. Such backflow of water may also be caused when the generator is shut down without draining the scrubber seal 18 because the gas remaining in the generator will cool down from the operating temperature and the resulting contraction will reduce the pressure to a degree that may be sufficient to cause a backflow of water. The contraction may even be great enough to cause a backflow of gas under the skirt 21 and it is desirable that this shall occur before the pressure in the generator is reduced substantially below atmospheric to avoid the occurrence of a subatmospheric pressure that might tend to draw in air or cause injury to the generator casing. To remove water that may reach the chamber 16, there is provided a drain conduit 72 connected to he lower part of the chamber 16 and depending down into a water seal 73. The depth of the seal 73 is sufficient to provide a head of water greater than the normal head of pressure of the gas in the generator. The conduit 71 also depends into the water seal 73 to a depth sufficient to prevent the escape of gas when under the normal pressure in the conduit seal 73 is provided with an overflow drain 74 and a vent pipe 75, both connected to the upper portion thereof, and a plugged drain connection connected to the lower portion for cleaning out lime that may settle to the bottom. A valve controlled drain connection 77 is also provided and connected between the bottom of the chamber 18 and the conduit 72. The valve in connection 77 is opened when it is desired to drain water from the chamber 18.

Rotation of the paddle assembly keeps the body of carbide and hydrate in the reaction chamber thoroughly agitated while the gas and vapor flowing upward assists the agitation and tends to make the hydrate more fluid-like. The carbide particles remain in the chamber 10 until consumed but the hydrate overflows the top of the chamber 10 and falls into the annular compartment 15. Here the hydrate is stirred and swept around by the scrapers 35 so as to fall into the hopper 64, from which it is withdrawn by conveyor 65 as a rate such as to maintain a plug of hydrate in the bottom of the hopper so that gas will not escape to the conveyor. Any other means for effecting a gas seal while withdrawing the hydrate might be used.

The acetylene and water vapor are released at the top of the reaction chamber into the relatively large space 12 above formed by the tank 11 and cover 20. In this space the velocity of flow is so reduced that the finer particles of hydrate settle down and the gas flows over the upper edge of tank 11, down between skirt 21 and chamber wall 16 and up through the scrubber water in the space between skirt 21 and the wall of seal 18. The serrations 24 cause the gas to pass in very small bubbles providing thorough contact with the water in the seal which consequently removes the last traces of hydrate and cools the gas to a desired temperature. A substantial portion of the vapor carried by the gas is condensed and flows off with the overflow water of the seal.

When first starting up the generator, the motor 63 is started, water is admitted at a constant rate to the scrubber at inlet 70 and the carbide valve 49 opened. When carbide enters the chamber 10, admission of water at a constant rate thereto is begun. When shutting down the generator, the carbide valve 49 is first shut off, the water is allowed to enter for a specified period of time and is then shut off and the paddles are kept turning for an additional period to insure that the moisture is evenly distributed and dispersed. The generator may then stand idle for a period without danger of lime caking in the reaction chamber.

The arrangement of the scrubber, according to the invention, in the form of an integral annular chamber about the upper rim of the chamber 12 provides a highly effective scrubber for the gas. The scrubber is compact and requires little additional space but the length of the edge 24 under which gas is passed is relatively very great so that large volumes of gas may be efficiently scrubbed. The serrations of the edge 24 and the length thereof cause the gas to be broken up into a large number of very fine bubbles so that effective contact with the water in the chamber 18 is assured. The lime dust carried by the gas is effectively washed out; the gas is effectively cooled; and excess moisture is condensed.

Feb. 13, 1940.　　F. SCHIMPFLE　　2,189,763
AERIAL TOY
Filed Sept. 21, 1939
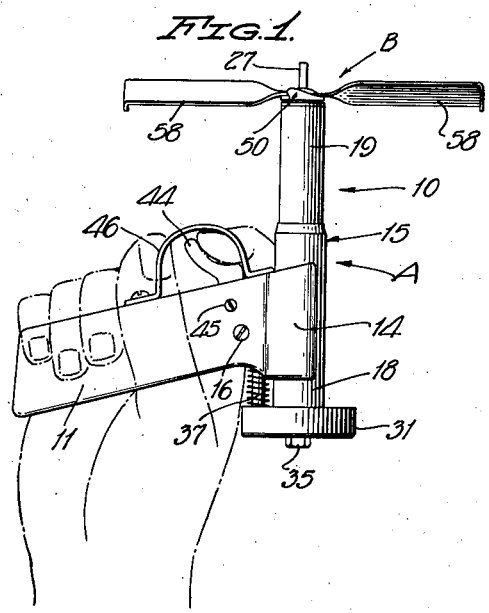
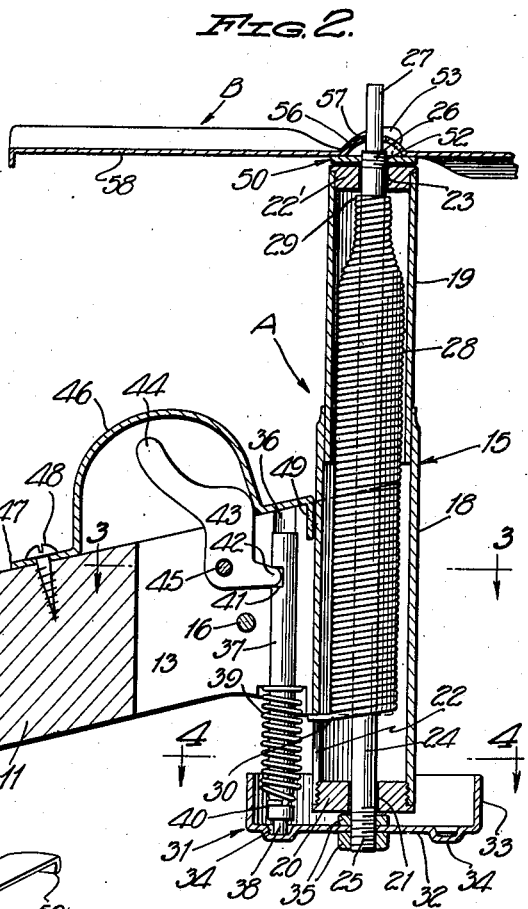
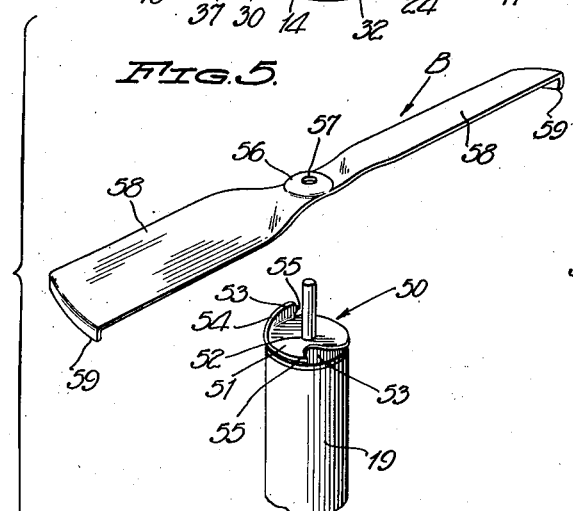
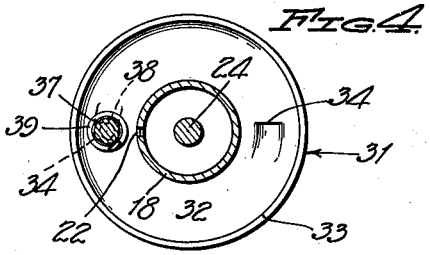
FRANK SCHIMPFLE.
INVENTOR.
ATTORNEYS.